United States Patent
Shah et al.

(10) Patent No.: US 10,423,235 B2
(45) Date of Patent: Sep. 24, 2019

(54) PRIMARY DEVICE THAT INTERFACES WITH A SECONDARY DEVICE BASED ON GESTURE COMMANDS

(71) Applicant: Google Technology Holdings, LLC., Mountain View, CA (US)

(72) Inventors: Amit K. Shah, Roundlake, IL (US); Amit Jain, Mundelein, IL (US)

(73) Assignee: Google Technology Holdings LLC, Mountain View, CA (US)

(*) Notice: Subject to any disclaimer, the term of this patent is extended or adjusted under 35 U.S.C. 154(b) by 323 days.

(21) Appl. No.: 15/450,255

(22) Filed: Mar. 6, 2017

(65) Prior Publication Data

US 2017/0177093 A1 Jun. 22, 2017

Related U.S. Application Data

(63) Continuation of application No. 14/476,197, filed on Sep. 3, 2014, now Pat. No. 9,588,591.

(Continued)

(51) Int. Cl.
*G06F 3/048* (2013.01)
*G06F 3/01* (2006.01)
(Continued)

(52) U.S. Cl.
CPC ............ *G06F 3/017* (2013.01); *G06F 3/0482* (2013.01); *G06F 3/04847* (2013.01);
(Continued)

(58) Field of Classification Search
CPC .... G06F 3/017; G06F 3/0482; G06F 3/04847; G06F 3/04883; H04W 4/80
See application file for complete search history.

(56) References Cited

U.S. PATENT DOCUMENTS 6,253,075 B1 * 6/2001 Beghtol ................ H04M 1/663
455/413
6,477,117 B1 * 11/2002 Narayanaswami .. G04G 13/026
368/224

(Continued)

FOREIGN PATENT DOCUMENTS

| EP | 1587286 A2 | 10/2005 |
| EP | 1587286 A3 | 2/2006 |
| WO | 2010034795 A1 | 4/2010 |

OTHER PUBLICATIONS

First Office Action and Search Report, and translation thereof, from counterpart Chinese Application No. 201480055889.1, dated Aug. 20, 2018, 21 pp.

(Continued)

*Primary Examiner* — Nicholas Augustine
(74) *Attorney, Agent, or Firm* — Shumaker & Sieffert, P.A.

(57) ABSTRACT

An incoming call from a remote device can be received by a primary device. The primary device can determine a numerical count of detected user gestures. Responsive to determining the numerical count of detected user gestures, the primary device can automatically generate an electronic message indicating a user will return the incoming call in a time frame based on the numerical count of detected user gestures. The primary device can automatically communicate the electronic message to the remote device.

27 Claims, 6 Drawing Sheets

Related U.S. Application Data

(60) Provisional application No. 61/889,278, filed on Oct. 10, 2013.

(51) Int. Cl.
| | | |
|---|---|---|
| *H04L 12/58* | (2006.01) | |
| *H04M 1/64* | (2006.01) | |
| *G06F 3/0488* | (2013.01) | |
| *G06F 3/0482* | (2013.01) | |
| *G06F 3/0484* | (2013.01) | |
| *H04W 4/80* | (2018.01) | |

(52) U.S. Cl.
CPC .......... *G06F 3/04883* (2013.01); *H04L 51/02* (2013.01); *H04M 1/64* (2013.01); *H04W 4/80* (2018.02); *H04M 2203/651* (2013.01); *H04M 2250/12* (2013.01)

(56) References Cited

U.S. PATENT DOCUMENTS

| | | | |
|---|---|---|---|
| 8,019,903 B2 | 9/2011 | Hanks et al. | |
| 8,144,122 B2 | 3/2012 | Chen et al. | |
| 8,294,668 B2 | 10/2012 | Podoloff et al. | |
| 8,339,363 B2 | 12/2012 | Krum et al. | |
| 8,341,318 B2 | 12/2012 | Holden et al. | |
| 8,341,558 B2 | 12/2012 | Li | |
| 8,341,598 B2 | 12/2012 | Peck et al. | |
| 2002/0164006 A1* | 11/2002 | Weiss | H04M 7/003 379/201.01 |
| 2004/0169674 A1* | 9/2004 | Linjama | G06F 1/1626 715/702 |
| 2005/0094781 A1 | 5/2005 | Basu | |
| 2007/0273648 A1* | 11/2007 | Fussinger | G06F 1/1626 345/161 |
| 2010/0144399 A1 | 6/2010 | Abeta | |
| 2010/0177598 A1* | 7/2010 | Zhang | G04G 13/026 368/10 |
| 2011/0022196 A1* | 1/2011 | Linsky | G06F 1/163 700/85 |
| 2011/0151850 A1* | 6/2011 | Haaparanta | H04M 1/2745 455/415 |
| 2012/0020190 A1* | 1/2012 | Suzusho | G04C 21/36 368/10 |
| 2013/0122957 A1 | 5/2013 | Lee | |
| 2013/0244633 A1 | 9/2013 | Jacobs et al. | |
| 2013/0321340 A1* | 12/2013 | Seo | G06F 1/1641 345/174 |
| 2014/0036643 A1* | 2/2014 | Messenger | G04G 13/021 368/251 |
| 2014/0051406 A1* | 2/2014 | Kim | H04M 3/436 455/414.1 |
| 2014/0111415 A1* | 4/2014 | Gargi | G06F 3/017 345/156 |
| 2014/0127665 A1* | 5/2014 | Arai | G06Q 50/20 434/362 |
| 2014/0180595 A1* | 6/2014 | Brumback | A61B 5/0015 702/19 |
| 2014/0197946 A1* | 7/2014 | Park | G08B 21/18 340/539.11 |
| 2014/0198628 A1* | 7/2014 | Yang | H04M 1/72566 368/262 |
| 2014/0205076 A1* | 7/2014 | Kumar | H04M 3/42042 379/142.01 |
| 2014/0267094 A1* | 9/2014 | Hwang | G06F 3/0488 345/173 |
| 2014/0269224 A1* | 9/2014 | Huh | G04G 13/021 368/73 |
| 2014/0320387 A1* | 10/2014 | Eriksson | G06F 3/017 345/156 |
| 2014/0372896 A1* | 12/2014 | Raman | G06F 3/0488 715/741 |
| 2015/0017956 A1* | 1/2015 | Jeong | H04M 1/57 455/414.1 |
| 2015/0094031 A1* | 4/2015 | Liu | H04M 3/02 455/412.2 |
| 2015/0181398 A1* | 6/2015 | Garbin | H04W 4/16 455/417 |
| 2016/0048211 A1* | 2/2016 | Raffle | G06F 3/017 715/863 |
| 2016/0239354 A1* | 8/2016 | Shen | G06Q 10/109 |

OTHER PUBLICATIONS

Jordans, Samsung unveils new smartwatch that makes calls (Update), 5 pages, Sep. 4, 2013.
International Search Report and Written Opinion from International Application No. PCT/US2014/059899, dated Dec. 22, 2014, 14 pp.
International Preliminary Report on Patentability from International Application No. PCT/US2014/059899, dated Apr. 21, 2016, 10 pp.
KREYOS: The ONLY Smartwatch with Voice & Gesture Control,http://www.indiegogo.com/projects/kreyos-the-only-smartwatch-with-voice-gesture-control, Mar. 4, 2014, 48 pgs.
Prosecution History from U.S. Appl. No. 14/476,197, from Oct. 6, 2014 through Dec. 29, 2016 14 pgs.
Notice of Intent to Grant and Text Intended to Grant from counterpart European Application No. 14795700.5, dated Jan. 26, 2018, 54 pp.
Second Office Action, and translation thereof, from counterpart Chinese Application No. 201480055889.1, dated Mar. 12, 2019, 8 pp.
Notice for Patent Registration, and translation thereof, from counterpart Chinese Application No. 201480055889.1, dated May 13, 2019, 4 pp.

\* cited by examiner

400

| User Gesture | Primary Device Operating Mode | Functionality |
|---|---|---|
| Tap once | Music playing | Pause music |
| | Video playing | Pause video |
| | Music paused | Play music |
| | Video paused | Play video |
| | Viewfinder active | Capture picture |
| Tap twice | Music playing | Skip to next song |
| | Music paused | Skip to next song |
| | Video playing | Skip to next video |
| | Video paused | Skip to next video |
| Tap thrice | Music playing | Skip to previous song |
| | Music paused | Skip to previous song |
| | Video playing | Skip to previous video |
| | Video paused | Skip to previous video |
| Tap <N> times | Reminders | Snooze for <N> minutes |
| | Incoming call | Dismiss call & send message indicating call return in <N> min. |
| Trace a check mark | Incoming call | Answer the call |
| Trace a X mark | Incoming call | Reject call |
| | Music playing/paused | Stop music playback |
| | Video playing/paused | Stop video playback |
| | Reminder/alarm | Dismiss reminder/alarm |
| | Camera viewfinder | Close camera |
| Shake device in one direction | Picture gallery | Move forward to next picture |
| | Music playing | Skip to next song |
| | Video playing | Skip to next video |
| | Web browser active | Move to next tab |
| | Email/messaging active | Move to next email/message in inbox |
| | Presentation active | Move to next slide in presentation |
| Put the secondary device with face down | Any mode | Silence/don't disturb mode of primary device |
| Put the secondary device with face up | Any mode | Allow primary device to interrupt the user |
| Cover the secondary device with palm | Any mode | Turn off display of primary device |
| Shake | Display off | Turn on the display of primary device |
| Trace a "+" sign | Any mode | Call emergency services/distress signal |
| Trace a clockwise arc | Any mode | Rotate the display by 90 degrees clockwise |
| Trace a counterclockwise arc | Any mode | Rotate the display by 90 degrees counterclockwise |
| Trace "f" on screen | Any mode | Open social networking app/website on primary device |
| Trace a "?" | Any mode | Present help menu for that mode |

FIG. 4

PRIMARY DEVICE THAT INTERFACES WITH A SECONDARY DEVICE BASED ON GESTURE COMMANDS

CROSS-REFERENCE TO RELATED APPLICATIONS

This application is a continuation of U.S. application Ser. No. 14/476,197, filed Sep. 3, 2014, which claims the benefit of U.S. Provisional Application No. 61/889,278, filed on Oct. 10, 2013, the entire contents of each of which are incorporated herein by reference.

BACKGROUND

Field of the Disclosure

The disclosure relates to communication devices and, more particularly, the use of secondary devices with communication devices.

Background

The use of mobile communication devices, such as smart phones and tablet computers, as a means of both voice and text base communication is commonplace throughout much of the world. Mobile communication devices sometimes also are used as a means of video communication (e.g., video calls). As technology has progressed, the functionality built into mobile communication devices has expanded. Wearable devices, such as wristwatches, that may be communicatively linked to mobile communication devices now are commercially available. Such wearable devices may be configured to present notifications generated by mobile communication devices, among other things.

SUMMARY

In one arrangement, a method includes receiving, by a primary device, an incoming call from a remote device. The method also includes determining, by the primary device, a numerical count of detected user gestures. The method further includes, responsive to determining the numerical count of detected user gestures, the primary device automatically generating an electronic message indicating a user will return the incoming call in a time frame corresponding to the numerical count of detected user gestures, and the primary device automatically communicating the electronic message to the remote device.

In another arrangement, a method includes receiving by a secondary device, from a primary device, at least one message, formatted for interpretation by a processor of the secondary device, carrying an incoming call indicator indicating that an incoming call from a remote device is being received by the primary device. The method also includes detecting, by the secondary device, at least one detected user gesture. The method further includes, responsive to detecting the at least one detected user gesture, generating, by the secondary device, an electronic message indicating a user will return the incoming call in a time frame corresponding to a numerical count of the at least one detected user gesture detected by the secondary device, and the secondary device automatically communicating the electronic message to the primary device, the electronic message configured to be communicated from the primary device to the remote device.

A primary device includes a processor programmed to initiate executable operations. The executable operations include receiving, by the primary device, an incoming call from a remote device. The executable operations also include determining, by the primary device, a numerical count of detected user gestures. The executable operations further include, responsive to determining the numerical count of detected user gestures, the primary device automatically generating an electronic message indicating a user will return the incoming call in a time frame corresponding to the numerical count of detected user gestures, and the primary device automatically communicating the electronic message to the remote device.

A secondary device includes a processor programmed to initiate executable operations. The executable operations include receiving by the secondary device, from a primary device, at least one message, formatted for interpretation by the processor of the secondary device, carrying an incoming call indicator indicating that an incoming call from a remote device is being received by the primary device. The executable operations also include detecting, by the secondary device, at least one detected user gesture. The executable operations further include, responsive to detecting the at least one detected user gesture, generating, by the secondary device, an electronic message indicating a user will return the incoming call in a time frame corresponding to a numerical count of the at least one detected user gesture detected by the secondary device, and the secondary device automatically communicating the electronic message to the primary device, the electronic message configured to be communicated from the primary device to the remote device.

BRIEF DESCRIPTION OF THE SEVERAL VIEWS OF THE DRAWINGS

FIG. 4 is a table presenting various examples of functions that may be implemented on a primary device responsive to user gestures detected by a secondary device.

DETAILED DESCRIPTION

Figure 1:
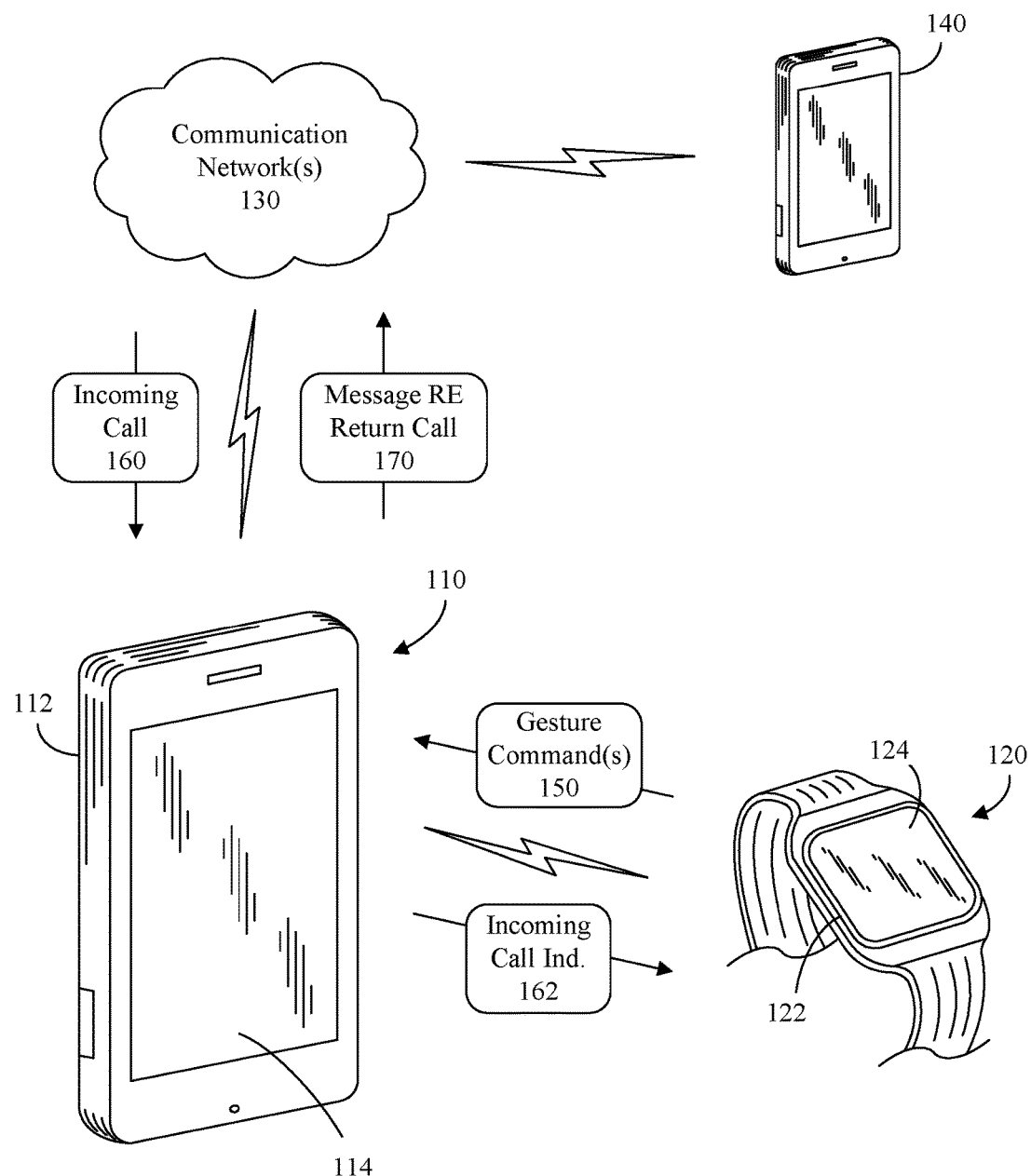
FIG. 1 is a block diagram illustrating an example of a communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

Arrangements described herein relate to using a secondary device to send gesture commands to a primary device. In accordance with these arrangements, a primary device can receive an incoming call from a remote device. While receiving the incoming call, the primary device can receive from a secondary device at least one gesture command. The gesture command(s) can indicate a numerical count of user gestures detected by the secondary device. Responsive to receiving the gesture command(s), the primary device can dismiss the incoming call. Further, the primary device can automatically generate an electronic message indicating the user will return the incoming call in a time frame (e.g., number of minutes, hours, days, etc.) corresponding to the numerical count of user gestures detected by the secondary device. The primary device can automatically communicate to the electronic message to the remote device, which can present the message to the caller. Accordingly, even though the incoming call is being dismissed, the caller can be made aware of when to expect a return call from the user.

Several definitions that apply throughout this document now will be presented.

As defined herein, the term "primary device" means a communication device configured to initiate outgoing calls and receive incoming calls. Examples of a primary device include, but are not limited to, a telephone, a mobile telephone, a smart phone, a personal digital assistant, a tablet computer, a laptop computer, a notebook computer, a netbook computer, a desktop computer, a portable gaming device, a set-top box, and the like. A call may be a telephone call or a video call. In the context of the arrangements described herein, a primary device is not a switch, router, base transceiver station, repeater, or hub per se. A primary device which is a mobile communication device, however, may operate as Wi-Fi hotspot that supports Wi-Fi tethering.

As defined herein, the term "remote device" means a communication device configured that is remotely located with respect to a primary device. Examples of a remote device include, but are not limited to, a telephone, a mobile telephone, a smart phone, a personal digital assistant, a tablet computer, a laptop computer, a netbook computer, a desktop computer, a portable gaming device, a set-top box a television, and the like.

As defined herein, the term "secondary device" means a device distinct from, and in communication with, a primary device, the device including a gesture sensor configured to support interaction between a user and the primary device. In the context of the arrangements described herein, a secondary device is not a mouse, a trackpad, a touchpad, a touchscreen or a gesture sensor per se. A secondary device, however, may include a touchpad, a touchscreen or other gesture sensor(s). Examples of a secondary device include, but are not limited to, a wearable device, or the like, which includes at least one gesture sensor. Such gesture sensor can be a touchscreen display, a sensor that detects a user touch or tap by a user appendage or stylus, a sensor that detects movement of a user appendage, a sensor that detects a facial expression, a sensor that detects eye movement, or the like.

As defined herein, the term "wearable device" means a secondary device wearable by a user. Examples of a wearable device include, but are not limited to, a wristwatch including a transmitter and/or communication port, glasses including a transmitter and/or communication port, jewelry including a transmitter and/or communication port, clothing including a transmitter and/or communication port, a hat including a transmitter and/or communication port, a wallet including a transmitter and/or communication port, a purse including a transmitter and/or communication port, a pen including a transmitter and/or communication port, and the like. In one aspect, a transmitter may be implemented as a transceiver.

As defined herein, the term "electronic message" means a message communicated via a communication network. Examples of an electronic message include, but are not limited to, a text message, an instant message, an e-mail, an electronically communicated voice message, an electronically communicated video message, and the like.

As defined herein, the term "gesture" means an action by a user detectable by a device. Examples of a gesture include, but are not limited to, a touch of a device by a user using a user appendage or stylus, a tap of a device by a user using a user appendage or stylus, movement of a user appendage or stylus, movement of a body of a user, a facial expression of a user, eye movement by a user, and the like. A "gesture" may be referred herein as a "user gesture."

As defined herein, the term "tap" means a gesture in which a user strikes lightly a device using an appendage or stylus.

As defined herein, the term "gesture command" means computer data corresponding to a detected gesture of a user and carried in a message formatted for interpretation by a processor. In this context, a message carrying a gesture command is not an "electronic message" as the term "electronic message" is defined herein. Specifically, a message carrying a gesture command is not a text message, an instant message, an e-mail, an electronically communicated voice message or an electronically communicated video message.

As defined herein, the term "user" means a person (i.e., a human being).

A defined herein, the term "incoming call" means an incoming telephone call or an incoming video call. An incoming call may be answered to establish a call session or may be dismissed. When an incoming call is received by a device, an audible and/or visual notification typically is presented by the device receiving the incoming call, or by another device communicatively linked to the device receiving the incoming call.

As defined herein, the term "call session" means a communication session including at least to parties. A call session may be a telephonic communication session or a video communication session.

As defined herein, the term "dismiss" means to not establish a live call session. For example, when an incoming call is dismissed, the incoming call can be left to go unanswered, the incoming call can be terminated, or the incoming call can be transferred to voice mail.

As defined herein, the term "personal area network" means a network via which peer-to-peer communication links are directly established between devices without use of a router, switch or access point. Communication protocols commonly used for communication between devices in a personal area network include, but are not limited to, IrDA, Bluetooth®, Zigbee®, wireless USB and Z-Wave.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. Examples of a computer readable storage medium include, but are not limited to, a portable computer diskette, a hard disk drive (HDD), a solid state drive (SSD), a read-only memory (ROM), Flash memory, an erasable programmable read-only memory (EPROM), a random access memory (RAM), a static random access memory (SRAM), a portable compact disc read-only memory (CD-ROM), a digital versatile disk (DVD), a memory stick and a floppy disk.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

FIG. 1 is a block diagram illustrating an example of a communication system (hereinafter "system") 100. The system 100 can include a primary device 110 and a secondary device 120 in communication with the primary device 110. In one arrangement, the primary device 110 can be a mobile communication device, for example a smart phone or tablet computer, and the secondary device 120 can be a wearable device, for example a wristwatch worn by a user. The present arrangements, however, are not limited to these examples.

The primary device 110 and secondary device 120 can be communicatively linked. In one arrangement, the primary device 110 and secondary device 120 can be communicatively linked via a wired connection, for example via a USB cable or the like. In another arrangement, the primary device 110 and secondary device 120 can be communicatively linked via a personal area network (PAN), a Serial Line (e.g., over Bluetooth Serial Port Profile (SPP)), an IEEE 802.11 (e.g., Wi-Fi) network, an IEEE 812.116 (WiMax) network, or the like. Hence, the secondary device 120 can be positioned proximate to the primary device 110, or positioned distal from the primary device 110. In illustration, the secondary device 120 can be worn by a user and the primary device 110 may be located anywhere within a suitable range for PAN communication between the primary device 110 and the secondary device 120. For example, Bluetooth® class 1 supports a range of up to about 1 m, Bluetooth® class 2 supports a range of up to about 10 m and Bluetooth® class 3 supports a range of up to about 100 m. Thus, the primary device may be carried in a user's pocket or purse, or located anywhere within PAN range of the secondary device 120, depending on the type of PAN being used.

The system 100 also can include one or more communication networks 130 via which the primary device 110 may communicate with one or more other devices, for example a remote device 140. The communication network(s) 130 may include connections, such as wire, wireless communication links, or fiber optic cables. The communication network(s) 130 can be implemented as, or include, any of a variety of different communication technologies such as a WAN, a LAN, a wireless network, a mobile network, a Virtual Private Network (VPN), the Internet, the Public Switched Telephone Network (PSTN), or the like. Various communication protocols known in the art may be implemented by the communication network(s) 130 to support communications between the primary device 110 and other devices. Examples of such communication protocols include, but are not limited to, IEEE 802.11, WiMax, TCP/IP, 3G, 4G, LTE, GSM, EDGE, GPRS, CDMA and WCDMA.

According to one arrangement, the primary device 110 can include a primary device housing 112 holding a display 114 configured to present to a user a primary visual user interface. In one aspect, the display 114 can be a touchscreen display configured detect user gestures in the form of touches, taps, marks, symbols and/or traces a user makes using an appendage or stylus. Further, the secondary device 120 can include a secondary device housing 122 holding a display 124 configured to present to the user a secondary visual user interface. In one aspect, the display 124 can be a touchscreen display configured to detect user gestures in the form of touches, taps marks, symbols and/or traces. The primary device 110 and/or secondary device 120 further can include one or more sensors/transducers configured to detect other user gestures, for example movement of a user's body, movement of a user's appendage or a stylus, user facial expressions, etc., as well as detect spoken utterances of the user.

In operation, a user can interface with the primary device 110 via the secondary device 120. Such operation can be supported by the exchange of messages between the primary device 110 and secondary device 120, for instance via a wired communication link, a PAN, a LAN, a WLAN, a WAN or any other suitable communication medium. In this regard, the primary device 110 can communicate to the secondary device 120 messages indicating menus, fields, controls, electronic messages, etc. to be presented by the secondary device 120, for example via the display 124. Responsive to the messages received from the primary device 110, the secondary device 120 can present such information to the user. Similarly, the secondary device 120 can communicate to the primary device 110 messages indicating user inputs received or detected by the secondary device 120. User inputs can be, for example, user gestures such as touches, taps, marks, symbols, traces and/or spoken utterances detected by the secondary device 120, shake vibration patters detected by the secondary device 120, an orientation of the secondary device 120, and the like. Based on the messages generated by the secondary device 120, the primary device 110 can initiate any of a myriad of corresponding processes.

By way of example, the primary device 110 can receive an incoming call 160 from the remote device 140. In one arrangement, responsive to receiving the incoming call 160, the primary device 110 can generate an alert. For example, the primary device 110 can generate an audible alert via an output audio transducer contained within or otherwise communicatively linked to the primary device 110, present a message on the display 114 indicating the incoming call 160, generate a haptic signal detectable by the user and/or communicate a message to the secondary device 120 that carries an incoming call indicator 162 indicating the incoming call 160. In the case that the primary device 110 communicates to the secondary device 120 the message that carries an incoming call indicator 162, responsive to receiving the message, the secondary device 120 can generate an audible alert via an output audio transducer contained within or otherwise communicatively linked to the secondary device 120, present a message on the display 124 indicating the incoming call 160, and/or generate a haptic signal detectable by the user.

Regardless of whether the user is alerted of the incoming call 160 via the primary device 110 or the secondary device 120, the user can generate one or more user gestures, detected by the secondary device 120, indicating how the primary device 110 is to handle the incoming call 160. One or more corresponding gesture commands 150 can be communicated from the secondary device 120 to the primary device 110. For example, one or more messages, formatted for interpretation by a processor of the primary device 110, can be communicated from the secondary device 120 to the primary device 110. These message(s) can carry the gesture command(s) 150, and the gesture commands 150 can be parsed from the messages. Responsive to receiving the gesture command(s) 150, the primary device 110 can implement corresponding call handling operations.

In illustration, responsive to being alerted of the incoming call 160, a user may select a suitable user interface control of the primary device 110 or the secondary device 120 to answer the incoming call 160. If, however, the user chooses to not answer the incoming call 160, the user may provide one or more user gestures, detected by the secondary device 120, indicating a desire to dismiss the incoming call 160. The user gesture(s) also may indicate a desire by the user to communicate to the caller an electronic message indicating that the user intends to return the call and the time frame in which the caller can expect to receive the return call.

For example, in one arrangement, the user can tap the secondary device 120 one or more times to indicate when the user intends to return the incoming call 160. Each tap can indicate a particular period, for example one minute, one hour or one day. The number (i.e., numerical count) of taps may be summed to indicate when the user intends to return the call. For instance, the user can tap the secondary device housing 122 or the display 124 one time to indicate the user intends to return the call in one minute, tap the secondary device housing 122 or the display 124 two times to indicate the user intends to return the call in two minutes, tap the secondary device housing 122 or the display 124 three times to indicate the user intends to return the call in three minutes, and so on. Each tap also can correspond to a plurality of minutes, hours or days. For example, a single tap may correspond to five minutes, ten minutes, fifteen minutes, one hour, two hours, three hours, one day, two days, three days, etc. In another arrangement, a single tap may indicate a first time period (e.g., fifteen minutes), two taps may indicate a second time period (e.g., one hour), and three taps may indicate a third time period (e.g., four hours).

Whether each tap corresponds to a minute, hour or day, a number of minutes, hours or days, or whether each sequence of taps corresponds to a particular time period, can be determined based on user settings stored in the primary device 110 or the secondary device 120. For example, the primary device 110 or the secondary device 120 can present to the user a configuration menu. In that menu, the user can assign a particular time period for each tap or a particular time period for each sequence of taps.

In one aspect, responsive to receiving a first tap from the user, the secondary device 120 can monitor for additional taps. For example, the secondary device 120 can detect additional taps within a particular period, for example within five seconds. In another example, the secondary device 120 can monitor for sequential taps that are temporally spaced by no more than a threshold value, for example with no greater than one second between taps. Responsive to detecting one or more taps within the particular period, or detecting a sequence of taps that are temporally spaced in an appropriate manner, the secondary device 120 can generate the gesture command 150 indicating the number (i.e., numerical count) of taps and communicate the gesture command 150 to the primary device 110. In another arrangement, rather than merely indicating the number of taps, the gesture command 150 can indicate the call back period indicated by the taps.

In another aspect, each time the user taps the secondary device 120, the secondary device 120 can generate, in real time, a corresponding gesture command 150 indicating a tap gesture, and communicate the gesture command 150 to the primary device 110. In this arrangement, the primary device 110 can receive a first gesture command 150 and detect whether additional gesture commands 150 are received within a particular period, and/or detect whether additional gesture commands 150 are received that are temporally spaced by no more than a threshold value. Responsive to receiving one or more gesture commands 150 within the particular period, or detecting a sequence of gesture commands 150 that are temporally spaced in an appropriate manner, the primary device 110 can determine the call back period indicated by the gesture command(s) 150.

Regardless of whether the primary device 110 receives a single gesture command 150 or a plurality of gesture commands 150 indicating the number (i.e., numerical count) of taps, the primary device 110 can interpret the gesture command(s) 150 as indicating that the user chooses to dismiss the incoming call 160 and desires to indicate that the call will be returned in a time frame indicated by the number of taps. In this regard, the primary device 110 can, based on the gesture command(s) 150, determine a numerical count of user gestures detected by the secondary device 120. Accordingly, responsive to receiving from the secondary device 120 the gesture command(s) 150, the primary device 110 can automatically generate an electronic message 170 indicating, for example in a body and/or subject line of the electronic message 170, when the user intends to return the call. The primary device can automatically communicate the electronic message 170 to the remote device 140 via the communication network(s) 130. For example, if the user taps the secondary device 120 five times, the electronic message 170 can indicate "I am not able to answer your call right now. I will call you back in five minutes," "I am not able to answer your call right now. I will call you back in twenty-five minutes," "I am not able to answer your call right now. I will call you back in five hours," etc., depending on the user settings. Notably, the present arrangements enable the user to quickly and easily dismiss the incoming call 160 via a secondary device 120, while ensuring that the electronic message 170 will be automatically communicated to the remote device 140 not only to notify the caller that the user is aware of the call, but also to notify the caller that the incoming call 160 will be returned within a timely manner.

In other arrangements, rather than tapping the secondary device 120, the user can present other user gestures detectable by the secondary device 120 to indicate whether to dismiss the incoming call 160 and indicate when the user intends to return the call. For example, responsive to being alerted of the incoming call 160 via the primary device 110 or the secondary device 120, the user can shake or rotate the secondary device 120 a number of times, with the number of shakes or rotations corresponding to the particular time frame in which the user intends to return the call.

In another aspect of the present arrangements, rather than the user providing user gestures that are detected by the secondary device 120, the user can provide user gestures that are detected by the primary device 110. In this regard, the primary device 110 can include any number of gesture sensors suitably configured to detect the user gestures, such as any of those previously described.

In illustration, the primary device 110 can be used with or without the secondary device 120. Regardless, the user can provide one or more user inputs, such as the gestures previously described, detectable by the primary device 110, and the primary device 110 can determine a numerical count of the detected user gestures. For example, if the display 114 of the primary device 110 is a touchscreen, the user can tap the display 114 one or more times to indicate when the user intends to return the incoming call 160. The user also can tap the housing 112 of the primary device 110 one or more times to indicate when the user intends to return the incoming call 160. In this case, the display 114 need not, though it can be, a touchscreen. As noted, the user inputs also can be, for example, user gestures such as touches, taps, marks, symbols, traces and/or spoken utterances detected by the primary device 110, shake vibration patters detected by the primary device 110, an orientation of the primary device 110, and the like. Based on detection of the user inputs, the primary device 110 can initiate any of a myriad of corresponding processes, such as those previously described, including sending the electronic message 170 to the remote device 140 indicating when the user will return the incoming call 160.

In a further arrangement, regardless of whether the primary device 110 or the secondary device 120 detects the user gestures, the primary device 110 can generate a notification alerting the user when it is time to return the incoming call 160. For example, the primary device 110 can schedule the notification to be presented responsive to expiration of the time frame corresponding to the numerical count of detected user gestures. The notification can be, for example, an audible alert generated by the primary device 110 or the secondary device 120, a haptic alert (e.g., a vibration) generated by the primary device 110 or the secondary device 120, a message presented on the display 114 or the display 124, or any other suitable type of notification. The primary device 110 can schedule the notification using a calendaring application, a timer, or any other suitable application or service, and generate the notification when the time frame corresponding to the numerical count of detected user gestures has expired. In the case that the notification is presented by the secondary device 120, the primary device 110 can communicate a message to the secondary device 120 when the notification is to be presented. Such message also can indicate to the secondary device 120 the type of notification that is to be presented. Responsive to receiving the message, the secondary device 120 can present the notification to the user.

Figure 2:
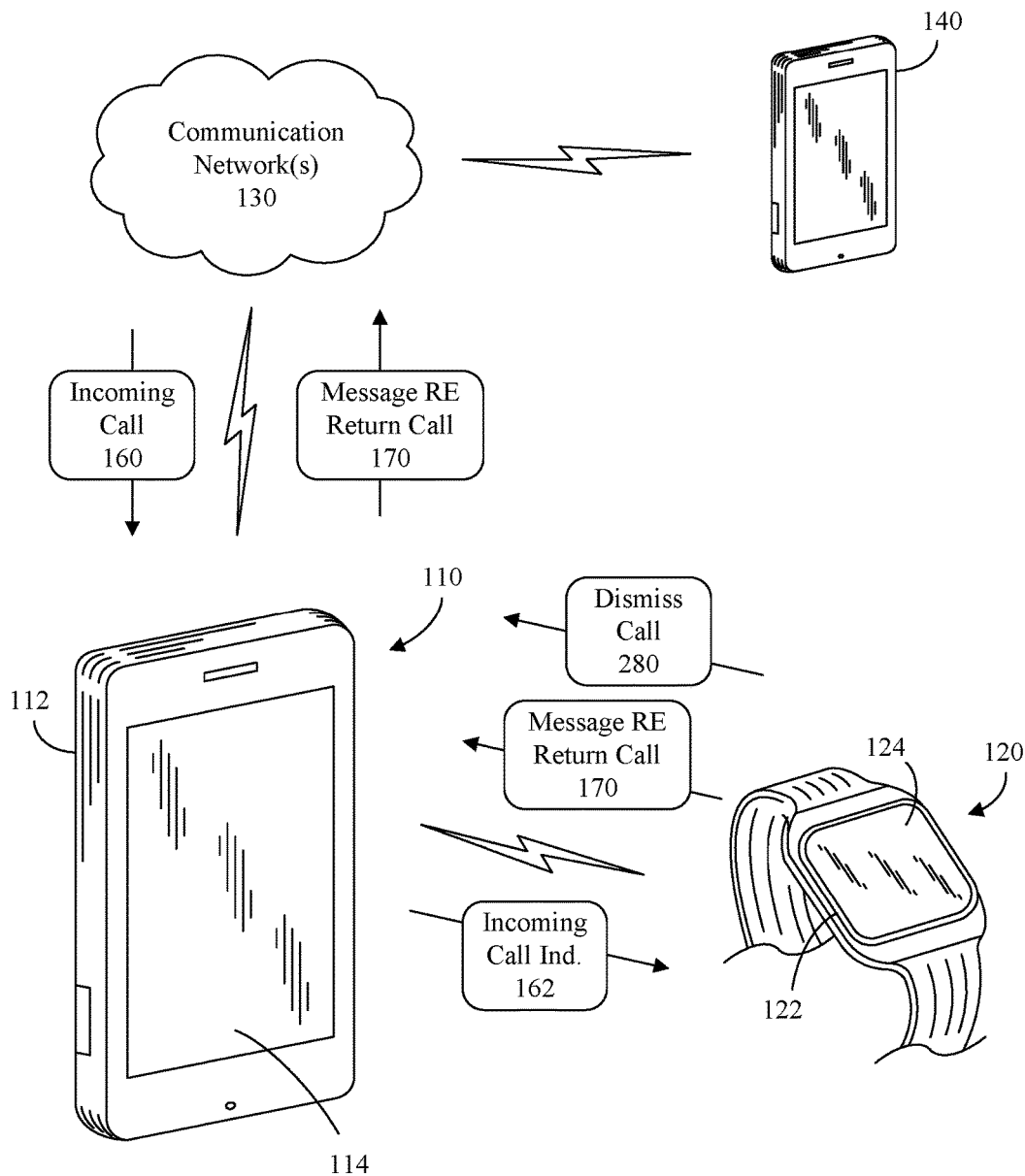
FIG. 2 is a block diagram illustrating another example of communication system.

FIG. 2 is a block diagram illustrating an example of another communication system (hereinafter "system") 200. The system 200 can include the primary device 110, the secondary device 120, the communication network(s) 130 and the remote device 140. The system 200 can operate substantially similar to the system 100 of FIG. 1, although in this example, rather than the primary device generating the electronic message 170 indicating when the user intends to return the call, the secondary device 120 can generate the electronic message 170.

In the present example, a communication link can be established between the primary device 110 and the secondary device 120, for example as previously described. Responsive to receiving an incoming call 160, the primary device 110 can communicate to the secondary device 120 the incoming call indicator 162. For example, the primary device 110 can communicate to the secondary device a message, formatted for interpretation by a processor of the secondary device 120, carrying the incoming call indicator 162. The secondary device 120 can parse the incoming call indicator 162 from the message and, based on the incoming call indicator 162, determine that the primary device 110 is receiving an incoming call 160.

Responsive to the secondary device 120 detecting one or more user gestures, such as taps, shakes, etc., when the incoming call 160 is being received by the primary device 110, the secondary device 120 can generate a message, formatted for interpretation by a processor of the primary device 110, carrying a command 280 indicating to the primary device 110 to dismiss the incoming call 160. The primary device 110 can receive the message carrying the command 280 and dismiss the call accordingly.

Further, the secondary device 120 can generate the electronic message 170 and communicate the electronic message 170 to the primary device 110. The primary device 110, in turn, can communicate the electronic message 170 to the remote device 140 via the communication network(s) 130. The electronic message 170 can be configured to be communicated from the primary device 110 to the remote device 140 in response to the primary device 110 receiving the electronic message 170 from the secondary device 120. For example, a header field of the electronic message 170 can include data (e.g., a parameter or flag) that indicates to the primary device 110 that the electronic message 170 is to be re-communicated to the remote device 140. As noted, the electronic message 170 can indicate, for example in a body and/or subject line of the electronic message 170, that the user is unable to answer the call, and indicate when the user expects to return the call. In this regard, the secondary device 120 can identify the number (i.e., numerical count) of detected user gestures and determine a time frame corresponding to the numerical count. The secondary device 120 can indicate this time frame in the electronic message 170.

Figure 3:
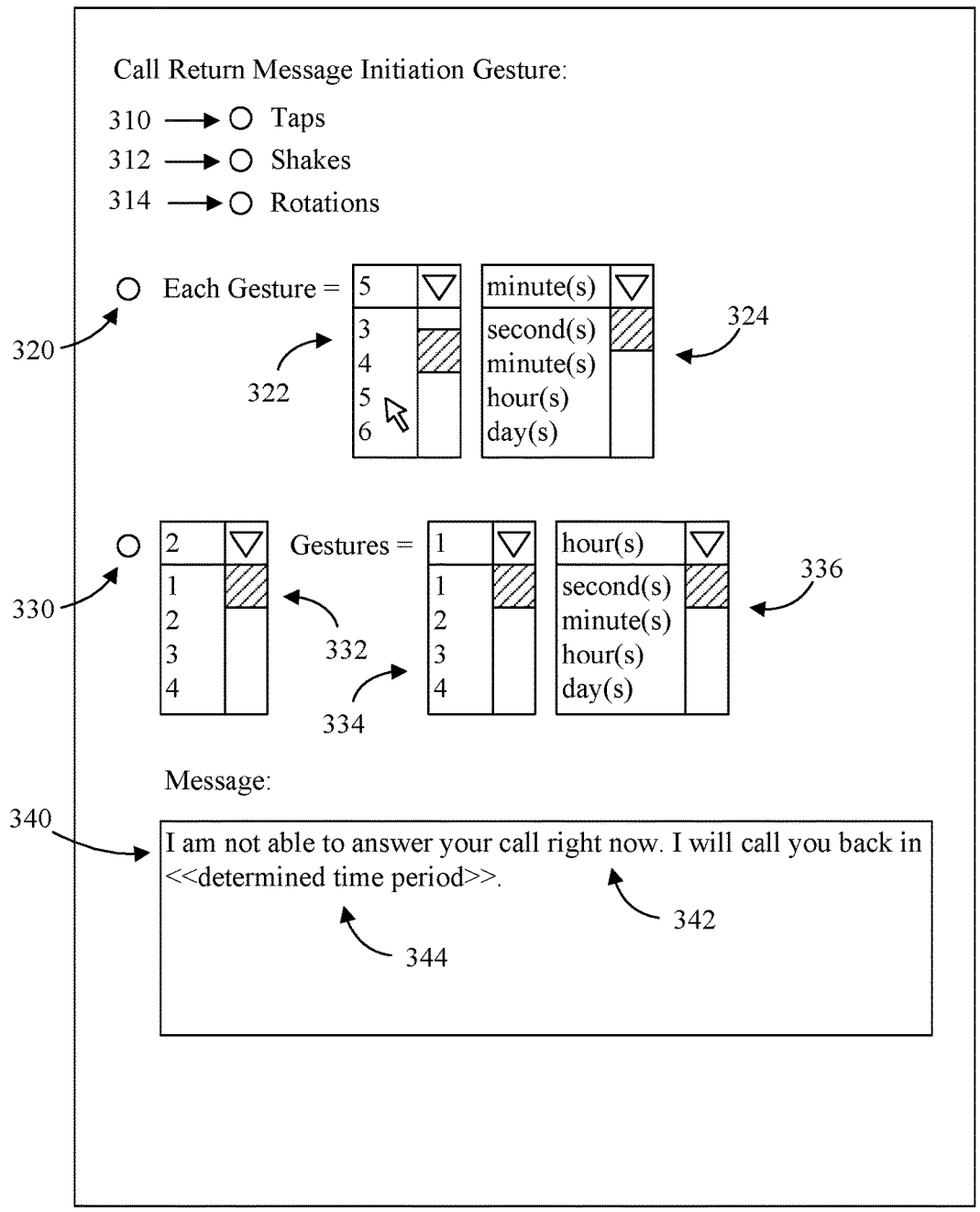
FIG. 3 depicts an example of a configuration menu via which a user may configure various gesture commands.

FIG. 3 depicts an example of a configuration menu 300 via which a user may configure various gesture commands. The configuration menu 300 can be presented by the primary device 110, the secondary device 120, or a computer to which the primary device 110 and/or secondary device 120 may be communicatively linked to receive configuration settings. The configuration menu 300 can present to a user various user configurable settings for configuring the gesture command(s) 150 and/or the electronic message 170. Such settings can be stored by the primary device 110 and/or secondary device 120. For instance, the settings can be stored by the primary device 110 in a computer readable data structure, such as a database, library file, a lookup table, or the like, and accessed by the primary device 110 when gesture commands 150 are received to determine which functions are to implemented and/or corresponding data that is to be generated.

The configuration menu 300 can include radio buttons, drop down menus and/or any other suitable user interface items configured to receive user inputs to configure the user settings. The configuration menu 300 can, for example, include menu items 310, 312, 314 selectable by the user, via one or more user inputs, to indicate a type of gesture the user chooses to be a user gesture that is processed to determine the intended time when the user will return a call. For example the menu item 310 can indicate taps of the secondary device 120, the menu item 312 can indicate shakes of the secondary device 120 and the menu item 314 can indicate rotations of the secondary device 120. Still, any other type of user gesture can be included in the configuration menu and the present arrangements are not limited in this regard.

The configuration menu 300 also can include menu items 320, 330 selectable by the user. The menu item 320 can be selectable by the user to indicate that each gesture is to correspond to a particular number of second, minutes, hours, days, etc. When the user selects the menu item 320, a menu item 322 can be presented to the user to select a number of time periods and a menu item 324 can be presented to the user to select a corresponding type of time period, for example second, minutes, hours, days, etc. For example, the user can select the menu items 320-324 to indicate that each user gesture corresponds to five minutes.

In lieu of selecting the menu item 320, the user may select the menu item 330. The menu item 330 can be selectable by the user to indicate that certain numbers of user gestures correspond to a certain numbers of time periods and corresponding types of time periods. In illustration, from a menu item 332, the user can select a particular number of user gestures, then from a menu item 334 select a number of time periods and from a menu item 336 select a corresponding type of time period. For example, the user can select the menu items 332-336 to indicate that one user gesture corresponds to fifteen minutes. A correspondence between the user selections from the menu items 334, 336 and the user selection from the menu item 332 can be stored. The user then can select another particular number of gestures from the menu item 332, then from the menu item 334 select a number of time periods and from the menu item 336 select a corresponding type of time period. For example, the user can select the menu items 332-336 to indicate that two user gestures correspond to one hour. A correspondence between the user selections from the menu items 334, 336 and the user selection from the menu item 332 again can be stored. The process can continue until the user has selected a time period/type for each desired number of user gestures. Accordingly, the user can define a specific time period/type for each desired number of user gestures. In this regard, the selected time period need not be linear with respect to the selected number of user gestures.

Data corresponding to the user selections from the menu items 310-336 can be stored by the primary device 110. When the gesture command(s) 150 is/are received, the data can be processed by the primary device 110 to determine the time frame as to when the user intends to return the incoming call 160, which is to be indicated in the electronic message 170.

In addition to the menu items 310-336, the configuration menu 300 also can include a menu item 340 in which the user can compose text to be included in the electronic message 170. For example, the menu item 340 can be a text input field in which the user enters text 342 to be included in the automatically generated electronic message 170. A field 344 can be reserved in the text to be auto-filled by the primary device 110 responsive to processing the gesture command(s) 150. Specifically, the field 344 can be reserved to indicate the time frame corresponding to the number of user gestures detected by the secondary device 120.

The present arrangements are not limited to the above examples, however. In this regard, FIG. 4 is a table 400 presenting various examples of functions that may be implemented on the primary device 110 responsive to user gestures detected by the primary device or the secondary device 120. Referring to FIGS. 1, 2 and 4, the left column of the table 400 lists example user gestures. The center column of the table 400 lists possible operating modes of the primary device 110 with which those user gestures can be associated. The right column of the table 400 lists functions of the primary device 110 which can be associated with a particular combination of user gesture and primary device operating mode. Data corresponding to the information presented in the table 400 can be stored, by the primary device 110 and/or the secondary device 120, in a computer readable data structure, such as a database, library file, a lookup table or the like. In one arrangement, responsive to gesture commands 150 being received from the secondary device 120, or the primary device 110 detecting the user gestures, the primary device 110 can access the information to identify functions corresponding to the gesture commands 150 that are to be implemented. In another arrangement, responsive to the secondary device 120 detecting user gestures, the secondary device 120 can access the information to identify functions corresponding to the user gestures that are to be implemented.

By way of example, if the user taps the secondary device 120 once, a corresponding gesture command 150 can be communicated from the secondary device 120 to the primary device 110. If the current operating mode of the primary device 110 is music playback, responsive to receiving the gesture command 150, the primary device can pause the music playback. If the current operating mode of the primary device 110 is music playback being paused, responsive to receiving the gesture command 150, the primary device can un-pause the music playback to play the music. Similarly, if the current operating mode of the primary device 110 is video playback, responsive to receiving the gesture command 150, the primary device can pause the video playback, and so on. If the user taps the secondary device 120 twice, a corresponding gesture command 150 can be communicated from the secondary device 120 to the primary device 110. Responsive to such gesture command 150, the primary device 110 can skip to the next song or video. If the user taps the secondary device 120 thrice, a corresponding gesture command 150 can be communicated from the secondary device 120 to the primary device 110. Responsive to such gesture command 150, the primary device 110 can skip to a previous song or video.

If the user taps the secondary device 120 one or more times when the primary device 110 is in an operating mode in which a reminder is being presented, on the primary device 110 and/or on the secondary device 120, a corresponding gesture command 150 can be communicated from the secondary device 120 to the primary device 110. Responsive to such gesture command 150, the primary device 110 can snooze the reminder for a particular time period corresponding to the number of taps. For example, if the user taps the secondary device 120 three times, the primary device 110 can snooze the reminder for three minutes, fifteen minutes, thirty minutes, three hours, etc. The amount of snooze time associated with each tap can be based on user configuration settings.

If the user taps the secondary device 120 one or more times when the primary device 110 is in an operating mode in which an incoming call 160 is being received, the primary device 110 can dismiss the call and send the electronic message 170 to the remote device 140 indicating the user will return the call in a time period corresponding to the number of taps, as previously described. If, however, the user provides a gesture tracing a check mark, a corresponding gesture command 150 can be communicated from the secondary device 120 to the primary device 110. Responsive to receiving such gesture command 150, the primary device 110 can answer the incoming call 160. If the user provides a gesture tracing an X mark, a corresponding gesture command 150 can be communicated from the secondary device 120 to the primary device 110. Responsive to receiving such gesture command 150, the primary device 110 can dismiss the incoming call 160 without sending an electronic message to the remote device 140. Depending on the operating mode of the primary device 110, the primary device 110 can implement other functionality in response to receiving a gesture command 150 corresponding to an X mark. For example, the primary device 110 can stop music or video playback, dismiss a reminder or alarm, close a camera, etc. In one arrangement, the user can trace the check mark or X mark on the display 124 of the secondary device 120. In another arrangement, the user can move an appendage, such as a finger, proximate to the secondary device, for example above the display 124. A gesture sensor of the secondary device can detect such user gesture and generate the corresponding gesture command 150.

Examples of other symbols that can be traced by a user as a user gesture include, but are not limited to, a plus sign, an arc, a letter, a question mark, etc. Again, responsive to receiving a gesture command 150 corresponding to such a gesture, the primary device 110 can implement a corresponding function. Notably, some functions can be implemented regardless of which mode the primary device currently is operating. For example, if a user gesture is a plus sign traced by a user, the primary device can initiate an emergency call and/or generate a distress signal. If the user traces a clockwise arc, information presented on the display 114 of the primary device 110 can be rotated ninety degrees clockwise, and if the user traces a counterclockwise arc, the information can be rotated ninety degrees counterclockwise. By tracing a letter, an application corresponding to the letter can be launched, or a web browser can be opened and directed to a website corresponding to the letter. Which applications/websites correspond to particular letters can be user configurable. Further, by tracing a question mark, the corresponding function that is initiated can be a help menu. The help menu that is presented can correspond to the particular mode in which the primary device is operating. For example, if the user is using a web browser and traces a question mark, a help menu for the web browser can be opened and presented on the display 114 of the primary device 110.

Other user gestures can include, but are not limited to, pinch gestures in which the user moves two fingers toward one another, an anti-pinch gesture in which the user moves two fingers away from one another, a swipe gesture in which the user moves a finger in a particular direction, the user shaking the secondary device 120 (e.g., in a particular direction or a particular type of rotation), orientating the secondary device 120 to be face down (e.g., the display 124 facing downward) or setting the secondary device 120 on a surface face down, sending the secondary device 120 on a surface face up, covering the secondary device with a hand, and the like. Examples of various functions corresponding to such gestures that may be implemented by the primary device 110 are presented in the table 400. Again, the functions that are implemented in response to certain gestures can be user configurable. For example, a user can choose a setting in which the display 114 of the primary device 110 is turned off when the user covers the secondary device 120 (e.g., the display 124) with the user's palm. In another example, a user can provide a pinch gesture to decrease the volume of audio playback or provide an anti-pinch gesture to increase the volume of audio playback. In yet another example, the user can provide an anti-pinch gesture to set a camera of the primary device 110 into a still image mode or provide a swipe gesture to set a camera of the primary device 110 into a video mode. Nonetheless, the user may define any number of settings in which particular functions are implemented by the primary device 110 in response to particular user gestures.

As noted, in one arrangement, rather than the secondary device 120 detecting the user gestures, the primary device 120 can detect the user gestures. Indeed, any of the gestures described herein as being entered to, or detected by, the secondary device 120 can be entered to, or detected by, the primary device 110.

Figure 5:
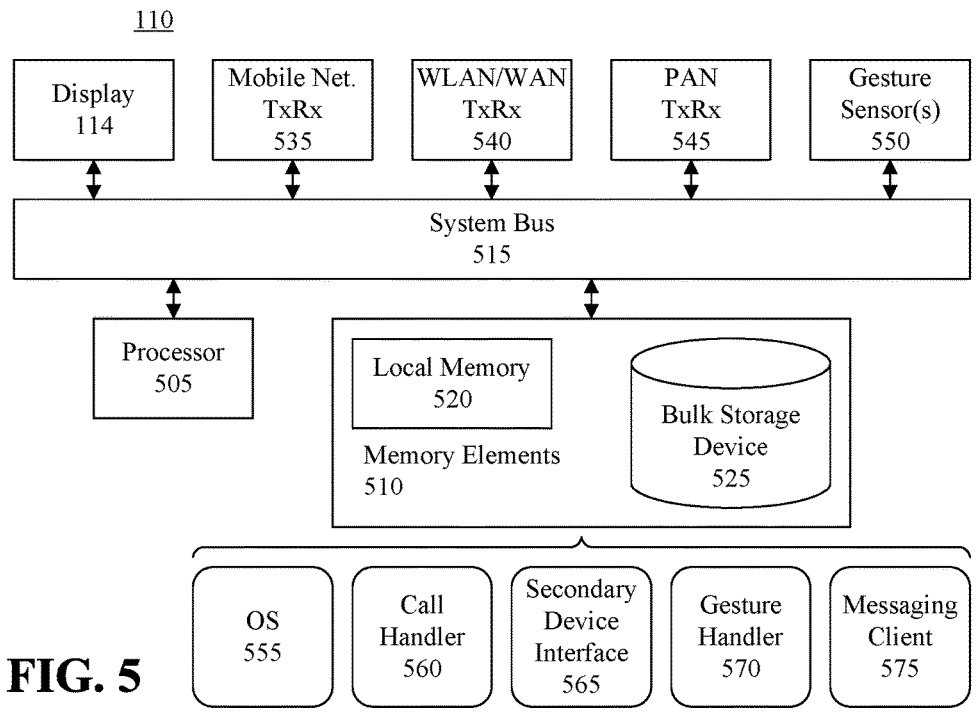
FIG. 5 is a block diagram illustrating example architecture for a primary device.

FIG. 5 is a block diagram illustrating example architecture for a primary device 110. The primary device 110 can include at least one processor 505 (e.g., a central processing unit or a controller) coupled to memory elements 510 through a system bus 515 or other suitable circuitry. As such, the primary device 110 can store program code within the memory elements 510. The processor 505 can execute the program code accessed from the memory elements 510 via the system bus 515.

The memory elements 510 can include one or more computer readable storage mediums (e.g., physical memory devices) such as, for example, local memory 520 and one or more bulk storage devices 525. Local memory 520 refers to RAM or other non-persistent memory device(s) generally used during actual execution of the program code. The bulk storage device(s) 525 can be implemented as Flash memory, EPROM, a SSD, a HDD, or other persistent data storage device. The primary device 110 also can include one or more cache memories (not shown) that provide temporary storage of at least some program code in order to reduce the number of times program code must be retrieved from the bulk storage device 525 during execution.

Input/output (I/O) devices can be coupled to the primary device 110. The I/O devices can be coupled directly to the systems bus 515 or processor 505, or connected via intervening controllers. The I/O devices can include, for example, the display 114. The I/O devices also can include one or more transceivers 535, 540, 545 also can be coupled to primary device 110 to enable primary device 110 to become coupled to other devices and systems through intervening private or public networks. In one arrangement, the primary device 110 can include a transceiver 535 configured to wirelessly communicate via a mobile network, a transceiver 540 configured to wirelessly communicate via a wireless local area network (WLAN) or wide area network (WAN) and a transceiver 545 configured to communicate via a PAN and/or Serial Line. The transceivers 535-545 can communicate using any suitable communication protocols, such as those previously described.

The I/O devices also can include one or more gesture sensors 550. Examples of such gesture sensors 550 include, but are not limited to, a camera that detects movements of a user's body or appendage and/or facial expressions of the user, one or more infrared sensors that detect movements of a user's body or appendage or of a stylus, one or more accelerometers that detect shake/vibration patterns applied to the primary device 110 by a user and/or orientation of the primary device 110, a gyroscope that detects position/movement of the primary device 110 by a user, a compass that detects orientation of the primary device 110, a touchpad that detects touches or taps by a user's appendage or a stylus, a microphone that detects spoken utterances or other sounds, and the like. In an arrangement in which the display 114 is a touchscreen display, one or more gesture sensors 550 can be included in the display 114 as touch sensors. Resistive touch sensors and capacitive touch sensors are well known examples of such touch sensors.

Optionally, other I/O devices (not shown) can be coupled to the primary device 110. For example, the primary device 110 may include communication ports, for example USB ports, via which the primary device 110 may use to communicate with the secondary device 120. The primary device 110 also can include one or more cameras configured to capture still images or video, one or more audio transducers, etc.

As pictured in FIG. 5, the memory elements 510 can store various software components of the primary device 110, for example an operating system 555, a call handler 560, a secondary device interface 565, a gesture handler 570, and a messaging client 575. Being implemented in the form of executable program code, these components of the primary device 110 can be executed by the primary device 110 and, as such, can be considered part of the primary device 110. Moreover, the operating system 555, call handler 560, secondary device interface 565, gesture handler 570, and messaging client 575 are functional data structures that impart functionality when employed as part of the primary device 110. The call handler 560, secondary device interface 565, gesture handler 570, and messaging client 575 can execute in a computing environment provided by the operating system 555. Other components, for example, communication modules, user interface modules, etc. also can execute in the computing environment provided by the operating system 555.

The call handler 560 can be configured to receive and process incoming calls, such as the incoming call 160 of FIG. 1, as well as place and process outgoing calls. Such calls can be received or placed via one or more communication networks, for example a mobile network, using the transceiver 535 to establish and maintain communication links with the communication network(s). The secondary device interface 565 can be configured to establish and maintain communication links with the secondary device 120, for example using the transceiver 545. In this regard, the secondary device interface 565 can send messages to, and receive messages from, the secondary device 120 via the transceiver 545. Messages that contain gesture commands can be processed by the secondary device interface 565 to parse the gesture commands from such messages and communicate the gesture commands to the gesture handler 570. The gesture handler 570 can process the gesture commands to initiate various functionality of the primary device 110, for example as described herein. For example, if a gesture command indicates a user gesture in which a user taps the secondary device 120, and such gesture command is received while an incoming call is being received, the gesture handler 570 can communicate a command to the call handler 560 to dismiss the incoming call and communicate a command to the messaging client 575 to send an electronic message to the calling device indicating that the call will be returned in a particular time frame, as described herein. In an arrangement in which the secondary device 120 generates electronic messages, such as the electronic message 170 of FIG. 2 indicating that the call will be returned in a particular time frame, the messaging client 575 can receive the electronic message 170 from the secondary device 120 and, in turn, communicate the message to a remote device.

Various other software modules/applications may be executed in the computing environment provided by the operating system 555 and utilized to facilitate functionality described herein and the present arrangements are not limited in this regard. Examples of other software modules/applications may include, but are not limited to, communication modules, user interface modules, calendaring applications, task tracking applications, reminder applications, presentation applications, and the like.

Figure 6:
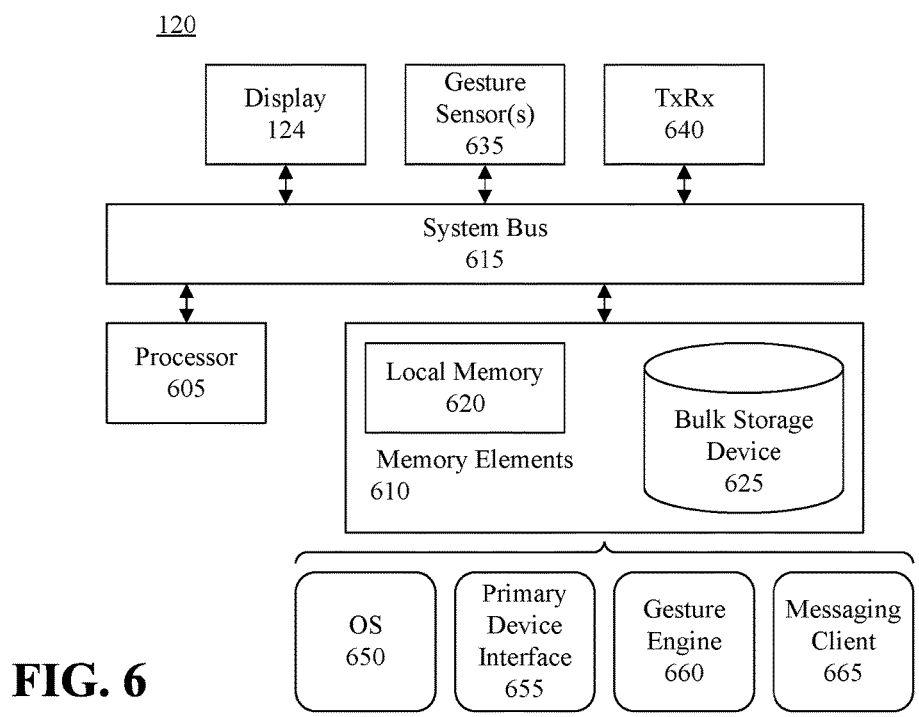
FIG. 6 is a block diagram illustrating example architecture for a secondary device.

FIG. 6 is a block diagram illustrating example architecture for the secondary device 120. The secondary device 120 can include at least one processor 605 (e.g., a central processing unit or a controller) coupled to memory elements 610 through a system bus 615 or other suitable circuitry. As such, the secondary device 120 can store program code within the memory elements 610. The processor 605 can execute the program code accessed from the memory elements 610 via the system bus 615.

The memory elements 610 c can include one or more computer readable storage mediums (e.g., physical memory devices) such as, for example, local memory 620 (e.g., RAM) and one or more bulk storage devices 625. The bulk storage device(s) 625 can be implemented as Flash memory, EPROM, SSD, a HDD, or other persistent data storage device. The secondary device 120 also can include one or more cache memories (not shown) that provide temporary storage of at least some program code in order to reduce the number of times program code must be retrieved from the bulk storage device 625 during execution.

I/O devices can be coupled to the secondary device 120. The I/O devices can be coupled directly to the systems bus 615 or processor 605, or connected via intervening controllers. The I/O devices can include, for example, the display 124. The I/O devices also can include one or more gesture sensors 635. Examples of such gesture sensors 635 include, but are not limited to, a camera that detects movements of a user's body or appendage and/or facial expressions of the user, one or more infrared sensors that detect movements of a user's body or appendage or of a stylus, one or more accelerometers that detect shake/vibration patterns applied to the secondary device 120 by a user and/or orientation of the secondary device 120, a gyroscope that detects position/movement of the secondary device 120 by a user, a compass that detects orientation of the secondary device 120, a touchpad that detects touches or taps by a user's appendage or a stylus, a microphone that detects spoken utterances or other sounds, and the like. In an arrangement in which the display 124 is a touchscreen display, one or more gesture sensors 635 can be included in the display 124 as touch sensors.

The I/O devices also can include at least one transceiver 640 that enables the secondary device 120 to become coupled to other devices, such as the primary device 110. The transceiver 640 can communicate using any communication protocols, such as those previously described, suitable for establishing a communication link between the secondary device 120 and the primary device 110. In one arrangement, the transceiver 640 can communicate via one or more PAN communication protocols. In another arrangement, the transceiver 640 can communicate via Wi-Fi, WiMax, or any other communication protocols suitable for establishing network connections. In one aspect, the secondary device 120 can communicate with the primary device 110 using a Secure Shell (SSH tunnel), though the present arrangements are not limited in this regard.

Optionally, other I/O devices (not shown) can be coupled to the secondary device 120. For example, the secondary device 120 may include communication ports, for example USB ports, via which the secondary device 120 may use to communicate with the primary device 110. The secondary device 120 also can include one or more cameras configured to capture still images or video, one or more audio transducers, etc.

As pictured in FIG. 6, the memory elements 610 can store various software components of the secondary device 120, for example an operating system 650, a primary device interface 655, a gesture engine 660 and, optionally, a messaging client 665. Being implemented in the form of executable program code, these components of the secondary device 120 can be executed by the secondary device 120 and, as such, can be considered part of the secondary device 120. Moreover, the operating system 650, primary device interface 655, gesture engine 660 and messaging client 665 are functional data structures that impart functionality when employed as part of the secondary device 120. The primary device interface 655, gesture engine 660 and messaging client 665 can execute in a computing environment provided by the operating system 650. Other components, for example, communication modules, user interface modules, calendaring applications, task tracking applications, reminder applications, presentation applications, and the like also can execute in the computing environment provided by the operating system 650.

The secondary device 120 can be configured to establish and maintain communication links with the primary device 110, for example using the transceiver 640. In this regard, the secondary device interface 565 can send messages to, and receive messages from, the secondary device 120 via the transceiver 640. The gesture engine 660 can receive signals/messages from the display 124 and/or gesture sensor(s) 635 corresponding to user gestures detected by such components. Further, the gesture engine 660 can generate corresponding gesture commands to the primary device interface 655, which can include the gesture commands in messages transmitted to the primary device 110.

In an arrangement in which the secondary device 120 generates electronic messages, such as the electronic message 170 of FIG. 2 indicating that the call will be returned in a particular time frame, the messaging client 665 can automatically generate the electronic message 170, for example as described herein, and communicate the electronic message 170 to the messaging client 575 of the primary device 110 via the transceiver 640. Various other software modules may be utilized to facilitate functionality described herein and the present arrangements are not limited in this regard.

Figure 7:
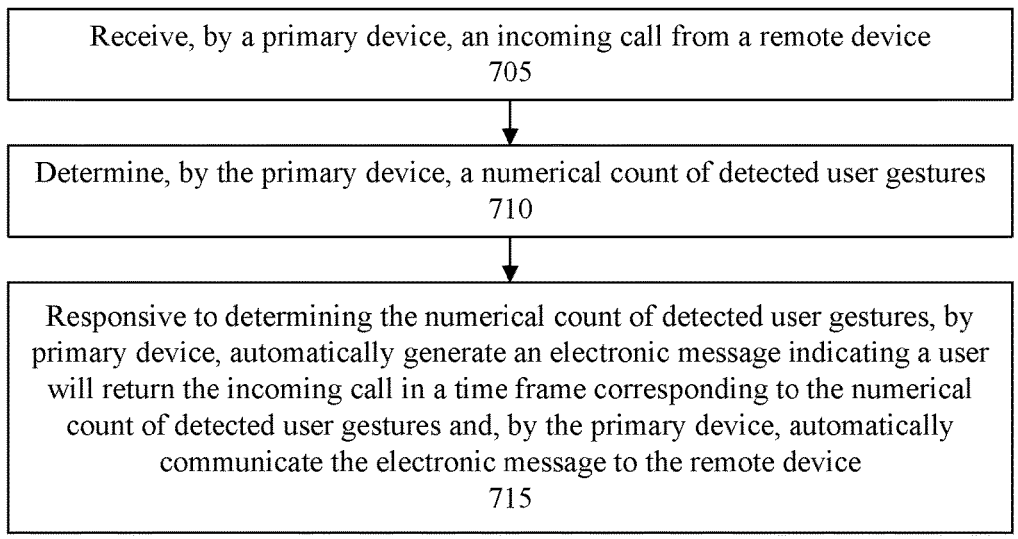
FIG. 7 is a flowchart illustrating an example of a method of generating a return call notification based on a user gesture.

FIG. 7 is a flowchart illustrating an example of a method 700 of generating a return call notification based on a user gesture. At step 705, an incoming call from a remote device can be received by a primary device. At step 710, the primary device can determine a numerical count of detected user gestures. The user gestures can be, for example, taps by the user on the primary device or a secondary device, or shakes of the primary device or the secondary device by the user. At step 715, responsive to determining the numerical count of detected user gestures, by primary device, the primary device can automatically generate an electronic message indicating a user will return the incoming call in a time frame corresponding to the numerical count of detected user gestures. The primary device can automatically communicate the electronic message to the remote device.

Figure 8:
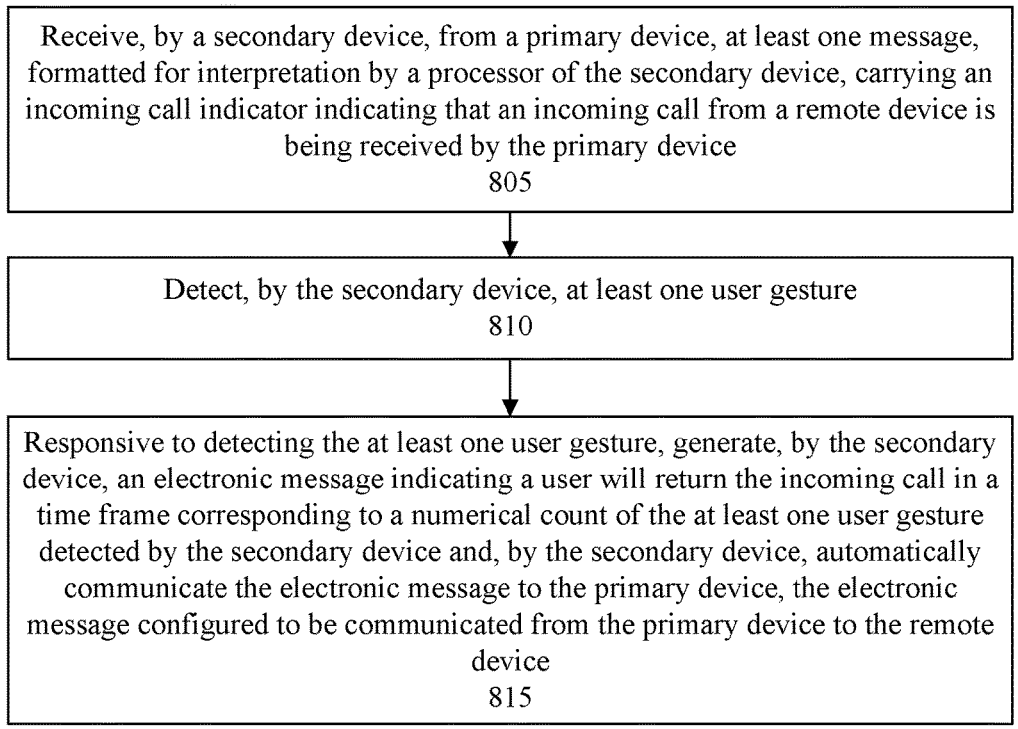
FIG. 8 is a flowchart illustrating another example of a method of generating a return call notification based on a user gesture.

FIG. 8 is a flowchart illustrating another example of a method 800 of generating a return call notification based on a user gesture. At step 805, a secondary device can receive, from a primary device, at least one message, formatted for interpretation by a processor of the secondary device, carrying an incoming call indicator indicating that an incoming call from a remote device is being received by the primary device. At step 810, the secondary device can detect at least one user gesture. The user gesture(s) can be, for example, one or more taps or shakes of the secondary device by the user. At step 815, responsive to detecting the at least one user gesture, the secondary device can generate an electronic message indicating a user will return the incoming call in a time frame corresponding to a numerical count of the at least one user gesture detected by the secondary device. The secondary device can automatically communicate the electronic message to the primary device. The electronic message can be configured to be communicated from the primary device to the remote device.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium having computer readable program instructions thereon for causing a processor to carry out aspects of the present invention.

Computer readable program instructions described herein can be downloaded to respective communication devices from a computer readable storage medium or to an external computer or external storage device via a network, for example, the Internet, a LAN, a WAN and/or a wireless network. The network may comprise copper transmission cables, optical transmission fibers, wireless transmission, routers, firewalls, switches, gateway computers and/or edge servers. A network adapter card or network interface in each communication device receives computer readable program instructions from the network and forwards the computer readable program instructions for storage in a computer readable storage medium within the respective communication device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of communication device, which execute via the processor of the communication device, create means for implementing the functions/acts specified in the flowchart and/or block diagram block or blocks. These computer readable program instructions may also be stored in a computer readable storage medium that can direct a communication device to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a communication device to cause a series of operational steps to be performed on the communication device to produce an automated process implemented by a processor, such that the instructions which execute on the communication device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one arrangement," "an arrangement," or similar language means that a particular feature, structure, or characteristic described in connection with the arrangement is included in at least one arrangement described within this disclosure. Thus, appearances of the phrases "in one arrangement," "in an arrangement," and similar language throughout this disclosure may, but do not necessarily, all refer to the same arrangement.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    sending, by a primary device to a secondary device, an indication of an operating mode in which a reminder is presented;
    receiving, by the primary device, from the secondary device subsequent to sending the indication, at least one message indicating a numerical count of user gestures detected by the secondary device, wherein the numerical count is greater than one; and
    responsive to receiving the message indicating the numerical count of detected user gestures;
        determining, by the primary device, a time period corresponding to the numerical count of the user gestures as a multiple of the numerical count and a predefined unit of time; and
        automatically snoozing, by the primary device, the reminder for the time period corresponding to the numerical count of the user gestures.

2. The method of claim 1,
    wherein receiving by the primary device, from the secondary device, the at least one message indicating the numerical count of the user gestures detected by the secondary device comprises receiving by the primary device the at least one message while the primary device is presenting the reminder.

3. The method of claim 1, wherein receiving by the primary device, from the secondary device, the at least one message indicating the numerical count of user gestures detected by the secondary device comprises:
    receiving by the primary device, from the secondary device, at least one message indicating a numerical count of times a user taps or shakes the secondary device.

4. The method of claim 1, wherein the secondary device is a wearable device in communication with the primary device.

5. The method of claim 1, further comprising:
responsive to expiration of the time period corresponding to the numerical count of user gestures, re-presenting the reminder by the primary device or the secondary device.

6. The method of claim 5, further comprising:
subsequent to re-presenting the reminder, receiving by the primary device, from the secondary device, at least one message indicating a user gesture tracing an "X" mark detected by the secondary device; and
responsive to receiving the message indicating the user gesture tracing the "X" mark detected by the secondary device, the primary device automatically dismissing the reminder.

7. The method of claim 1, further comprising:
presenting a user configuration menu, the user configuration menu presenting a plurality of user configurable settings;
receiving, via the user configuration menu, at least one user input indicating that the numerical count of user gestures corresponds to the time period; and
storing, in a computer readable data structure, data indicating that the numerical count of user gestures corresponds to the time period,
wherein automatically snoozing the reminder for the time period corresponding to the numerical count of user gestures comprises accessing the data stored in the computer readable data structure to automatically identify the time period corresponding to the numerical count of user gestures.

8. The method of claim 7, wherein receiving the at least one user input indicating that the numerical count of user gestures corresponds to the time period comprises receiving at least one user input specifying a number of minutes to snooze reminders per user gesture.

9. A method, comprising:
receiving, by a secondary device and from a primary device, an indication of an operating mode in which a reminder is presented;
detecting, by a secondary device, at least two user gestures;
responsive to detecting the at least two user gestures and receiving the indication:
determining, by the secondary device, a time period corresponding to the numerical count of the at least two user gestures as a multiple of the numerical count by a predefined unit of time; and
generating, by the secondary device, a message indicating an instruction to snooze the reminder for the time period corresponding to the numerical count of the at least two user gestures detected by the secondary device; and
automatically communicating, by the secondary device, the message to the primary device.

10. The method of claim 9, wherein receiving the indication comprises receiving, by the secondary device, at least one message from the primary device indicating that the reminder is being presented by the primary device.

11. The method of claim 9, further comprising:
responsive to receiving the indication from the primary device, presenting, by the secondary device, the reminder.

12. The method of claim 9, further comprising:
detecting, by the secondary device, a user gesture tracing an "X" mark;
responsive to detecting the user gesture tracing the "X" mark, generating, by the secondary device, a message indicating to the primary device to dismiss the reminder; and
communicating, by the secondary device, the message to the primary device.

13. The method of claim 9, wherein detecting, by the secondary device, at least one user gesture comprises detecting at least one tap of the secondary device by the user.

14. The method of claim 9, wherein the secondary device is a wearable device in communication with the primary device.

15. A primary device, comprising:
a processor programmed to initiate executable operations comprising:
sending, to a secondary device, an indication of an operating mode in which a reminder is presented;
receiving, from the secondary device subsequent to sending the indication, at least one message indicating a numerical count of user gestures detected by the secondary device, wherein the numerical count is greater than one; and
responsive to receiving the message indicating the numerical count of user gestures;
determining a time period corresponding to the numerical count of the user gestures as a multiple of the numerical count and a predefined unit of time; and
automatically snoozing the reminder for the time period corresponding to the numerical count of detected user gestures.

16. The primary device of claim 15, wherein receiving, from the secondary device, the at least one message indicating the numerical count of detected user gestures detected by the secondary device comprises:
receiving, from the secondary device, at least one message indicating a numerical count of times the user taps or shakes the secondary device.

17. The primary device of claim 15, wherein the secondary device is a wearable device in communication with the primary device.

18. The primary device of claim 15, the executable operations further comprising:
responsive to expiration of the time period corresponding to the numerical count of detected user gestures, re-presenting the reminder by the primary device or the secondary device.

19. The primary device of claim 18, the executable operations further comprising:
subsequent to re-presenting the reminder, receiving, from the secondary device, at least one message indicating a user gesture tracing an "X" mark detected by the secondary device; and
responsive to receiving the message indicating the user gesture tracing the "X" mark detected by the secondary device, automatically dismissing the reminder.

20. The primary device of claim 15, the executable operations further comprising:
presenting a user configuration menu, the user configuration menu presenting a plurality of user configurable settings;
receiving, via the user configuration menu, at least one user input indicating that the numerical count of detected user gestures corresponds to the time period; and storing, in a computer readable data structure, data indicating that the numerical count of user gestures corresponds to the time period;

wherein automatically snoozing the reminder for the time period corresponding to the numerical count of user gestures comprises accessing the data stored in the computer readable data structure to automatically identify the time period corresponding to the numerical count of user gestures.

21. The primary device of claim 20, wherein the executable operations for receiving the at least one user input indicating that the numerical count of user gestures corresponds to the time period comprise executable operations for receiving at least one user input specifying a number of minutes to snooze reminders per user gesture.

22. A secondary device, comprising:
a processor programmed to initiate executable operations comprising:
receiving, from a primary device, an indication of an operating mode in which a reminder is presented;
detecting at least two user gestures;
responsive to detecting the at least two user gestures and receiving the indication:
determining, by the secondary device, a time period corresponding to the numerical count of the at least two user gestures as a multiple of the numerical count by a predefined unit of time; and
generating message indicating an instruction to snooze the reminder for the time period corresponding to the numerical count of the at least two user gestures detected by the secondary device; and
automatically communicating the message to the primary device.

23. The secondary device of claim 22, the executable operations further comprising:
detecting, by the secondary device, a user gesture tracing an "X" mark;
responsive to detecting the at least one user gesture tracing the "X" mark, generating, by the secondary device, a message indicating to the primary device to dismiss the reminder; and
communicating the message to the primary device.

24. The secondary device of claim 22, wherein detecting, by the secondary device, at least one user gesture comprises detecting at least one tap of the secondary device by the user.

25. The secondary device of claim 22, wherein the secondary device is a wearable device in communication with the primary device.

26. The method of claim 1, wherein sending the indication of an operating mode in which a reminder is presented comprises instructing the secondary device to present the reminder.

27. The primary device of claim 1, wherein sending the indication of an operating mode in which a reminder is presented comprises instructing the secondary device to present the reminder.

* * * * *